US009485042B2

(12) United States Patent
Park et al.

(10) Patent No.: US 9,485,042 B2
(45) Date of Patent: Nov. 1, 2016

(54) TRANSMITTING AND RECEIVING APPARATUS AND METHOD FOR SEPARATING MULTIPLE BROADCAST SIGNALS IN TERRESTRIAL CLOUD BROADCAST SYSTEM

(71) Applicant: Electronics and Telecommunications Research Institute, Daejeon-si (KR)

(72) Inventors: Sung Ik Park, Daejeon-si (KR); Heung Mook Kim, Daejeon-si (KR); Nam Ho Hur, Daejeon-si (KR); Jeong Chang Kim, Busan (KR)

(73) Assignee: ELECTRONICS AND TELECOMMUNICATIONS RESEARCH INSTIT, Daejeon-Si (KR)

(*) Notice: Subject to any disclaimer, the term of this patent is extended or adjusted under 35 U.S.C. 154(b) by 726 days.

(21) Appl. No.: 13/907,150

(22) Filed: May 31, 2013

(65) Prior Publication Data

US 2013/0322423 A1 Dec. 5, 2013

(30) Foreign Application Priority Data

Jun. 1, 2012 (KR) ........................ 10-2012-0059083
Apr. 26, 2013 (KR) ........................ 10-2013-0046437

(51) Int. Cl.

| | |
|---|---|
| ***H04L 12/28*** | (2006.01) |
| ***H04H 20/42*** | (2008.01) |
| ***H04H 20/72*** | (2008.01) |
| ***H04H 60/07*** | (2008.01) |
| *H04J 1/16* | (2006.01) |

(52) U.S. Cl.
CPC .......... *H04H 20/423* (2013.01); *H04H 20/72* (2013.01); *H04H 60/07* (2013.01)

(58) Field of Classification Search
USPC ......................... 370/208, 419, 463, 487, 329
See application file for complete search history.

(56) References Cited

U.S. PATENT DOCUMENTS

2003/0165184 A1* 9/2003 Welborn .............. H04B 1/7176 375/146
2007/0074242 A1* 3/2007 Wang ....................... H04K 1/00 725/31
2010/0067512 A1* 3/2010 Nam ...................... H04B 7/068 370/342
2011/0077038 A1 3/2011 Montojo et al.

FOREIGN PATENT DOCUMENTS

KR 1020090010927 A 1/2009
KR 1020090073209 A 2/2009

* cited by examiner

*Primary Examiner* — John Pezzlo
(74) *Attorney, Agent, or Firm* — William Park & Associates Ltd.

(57) ABSTRACT

A transmitting and receiving apparatus and method for separating multiple broadcast signals from each other in a terrestrial cloud broadcast system are provided. A terrestrial cloud broadcast signal transmitting apparatus may include a plurality of transmitters for transmitting a plurality of terrestrial cloud broadcast signals, wherein each of the plurality of transmitters includes, an encoder encoding input data to generate a code word and a scrambler scrambling the generated code word using a scramble sequence uniquely allocated for each transmitter so that the plurality of terrestrial cloud broadcast signals are distinguished from each other.

11 Claims, 5 Drawing Sheets

TRANSMITTING AND RECEIVING APPARATUS AND METHOD FOR SEPARATING MULTIPLE BROADCAST SIGNALS IN TERRESTRIAL CLOUD BROADCAST SYSTEM

CROSS-REFERENCE TO RELATED APPLICATION

This application claims priority to Korean Patent Application No. 10-2012-0059083 filed on Jun. 1, 2012 and No. 10-2013-0046437 filed on Apr. 26, 2013, the contents of which are herein incorporated by reference in its entirety.

TECHNICAL FIELD

Embodiments of the present invention are directed to a transmitting and receiving apparatus and method for separating terrestrial cloud broadcast signals to distinguish and decode a plurality of broadcast signals transmitted from different transmitters in a terrestrial cloud broadcast system that operates in a single frequency network.

DISCUSSION OF THE RELATED ART

The current terrestrial TV broadcasting causes co-channel interference that amounts to three times the service coverage and thus cannot reuse the same frequency in an area that is within three times the service coverage. As such, the area where frequency cannot be reused is referred to as white space. Occurrence of a white space sharply deteriorates spectrum efficiency. This situation led to the need of a transmission technology that facilitates reuse of frequency and removal of white space, which focus upon robustness in reception, as well as an increase in transmission capacity, so as to enhance spectrum efficiency.

A terrestrial cloud broadcast technology that provides for easy reuse, prevents white space from occurring, and allows a single frequency network to be readily set up and operated has been recently suggested in the document entitled "Cloud Transmission: A New Spectrum-Reuse Friendly Digital Terrestrial Broadcasting Transmission System", published on IEEE Transactions on Broadcasting, vol. 58, no. 3.

A use of such terrestrial cloud broadcast technology enables a broadcaster to transmit broadcast content that is the same nationwide or different per local area through a single broadcast channel. To achieve such goal, however, the receiver should be able to receive one or more terrestrial cloud broadcast signals in an area where signals transmitted from different transmitters overlap, i.e., overlapping area, and should be able to distinguish the received terrestrial cloud broadcast signals from each other and demodulate the distinguished signals.

SUMMARY

An object of the present invention is to provide a terrestrial cloud broadcast signal transmitting apparatus and method that may separate a plurality of terrestrial cloud broadcast signals from each other in a terrestrial cloud broadcast system. Another object of the present invention is to provide a terrestrial cloud broadcast signal receiving apparatus and method that may separate one or more terrestrial cloud broadcast signals from each other and decode the separated signals.

According to an aspect of the present invention, a terrestrial cloud broadcast signal transmitting apparatus may include a plurality of transmitters for transmitting a plurality of terrestrial cloud broadcast signals, wherein each of the plurality of transmitters includes an encoder encoding input data to generate a code word and a scrambler scrambling the generated code word using a scramble sequence uniquely allocated for each transmitter so that the plurality of terrestrial cloud broadcast signals are distinguished from each other.

In an embodiment, terrestrial cloud broadcast signals may be distinguished from each other based on a scramble sequence uniquely allocated to each of the terrestrial cloud broadcast signals.

In another embodiment, the scrambler may scramble the generated code word by multiplying the scramble sequence by the generated code word or by performing an XOR (Exclusive or) operation between the scramble sequence and the generated code word.

In still another embodiment, the scramble sequence may be selected so that the scrambled code word is not included in a set of code words that may be generated by the encoder.

In yet still another embodiment, the terrestrial cloud broadcast signal transmitting apparatus may further include a generator generating the scramble sequence.

The scrambler may scramble the generated code word using the scramble sequence generated by the generator.

According to another aspect of the present invention, a method of separating a plurality of terrestrial cloud broadcast signals from each other by a transmitting apparatus may include encoding input data by using a plurality of encoders, respectively, to generate a code word and scrambling the generated code word using a scrambler based on a scramble sequence uniquely allocated for each transmitter so that the plurality of terrestrial cloud broadcast signals are distinguished from each other.

According to still another aspect of the present invention, a method of decoding a terrestrial cloud broadcast signal by a receiving apparatus may include receiving one or more terrestrial cloud broadcast signal, distinguishing the received terrestrial cloud broadcast signals based on a scramble sequence uniquely allocated for each terrestrial cloud broadcast signal, inverse-scrambling the distinguished terrestrial cloud broadcast signals using an inverse scrambler corresponding to the distinguished terrestrial cloud broadcast signals, and decoding the inverse-scrambled signals using a decoder.

The terrestrial cloud broadcast signal receiving apparatus may separate terrestrial cloud broadcast signals from each other by scrambling code word based on a scramble sequence uniquely allocated for each transmitter.

The terrestrial cloud broadcast signal receiving apparatus may separate terrestrial cloud broadcast signals from each other based on a scramble sequence uniquely allocated per terrestrial cloud broadcast signal, and even when receiving a plurality of terrestrial cloud broadcast signals at the same time, may thus demodulate each terrestrial cloud broadcast signal.

BRIEF DESCRIPTION OF THE DRAWINGS

The embodiments of the present invention will become readily apparent by reference to the following detailed description when considered in conjunction with the accompanying drawings wherein.

DESCRIPTION OF THE EMBODIMENTS

Embodiments of the present invention will be described in detail with reference to the accompanying drawings to be worked on by those of ordinary skill in the art. However, the present invention may be embodied in various ways and is not limited thereto. What is irrelevant to the present invention has been omitted from the drawings, and similar denotations have been assigned to similar components throughout the specification.

As used herein, when an element "includes" or "comprises" another element, the element, unless stated otherwise, may further include or comprise the other element, but not excluding the other element. Further, as used herein, the term "unit" or "part" means a basis for processing at least one function or operation, which may be implemented in hardware or software or in a combination of software and hardware.

Figure 1:
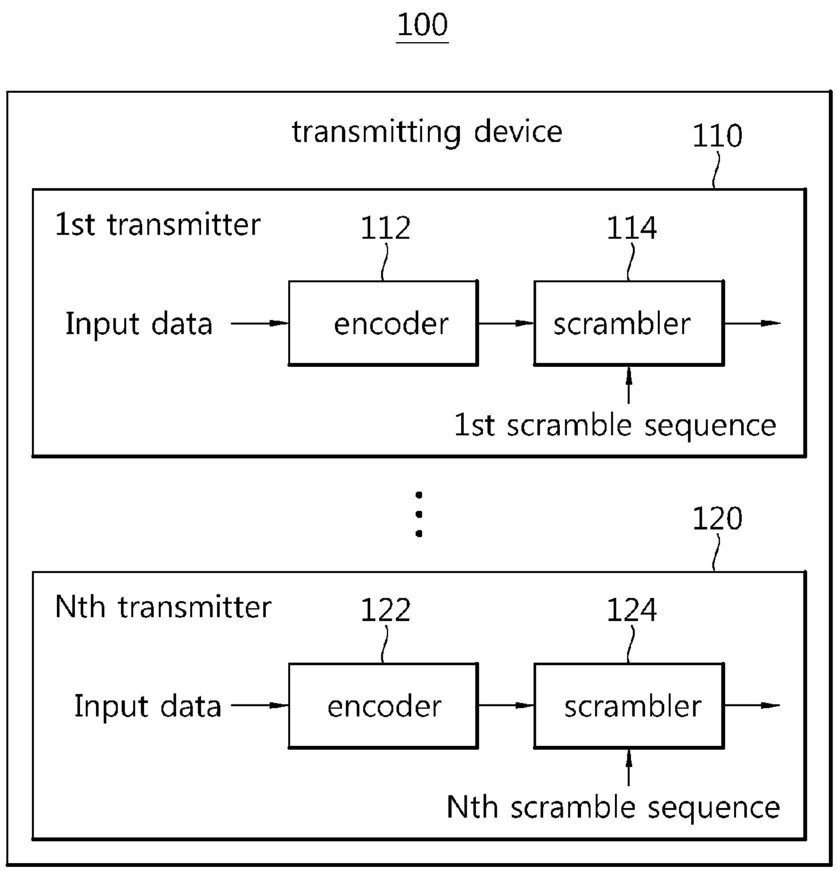
FIG. 1 is a block diagram illustrating a transmitting apparatus that transmits a terrestrial cloud broadcast signal according to an embodiment of the present invention.

FIG. 1 is a block diagram illustrating a transmitting apparatus that transmits a terrestrial cloud broadcast signal according to an embodiment of the present invention. Hereinafter, an example is described in connection with FIG. 1, in which the terrestrial cloud broadcast signal transmitting apparatus according to the present invention includes N (where, N is a natural number other than 1) transmitters.

The terrestrial cloud broadcast signal transmitting apparatus 100 according to the present invention, as shown in FIG. 1, may include a plurality of transmitters (first transmitter 110 to Nth transmitter 120) for transmitting a plurality of terrestrial cloud broadcast signals.

The terrestrial cloud broadcast signal transmitted from each transmitter 110 or 120 may include error-correction coded data. For this purpose, each transmitter 110 or 120 may include an encoder 112 or 122 for error correction encoding input data to generate a code word and a scrambler 114 or 124 for scrambling the code word generated by the encoder 112 or 122 using a scramble sequence uniquely allocated for each transmitter 110 or 120 so that the plurality of terrestrial cloud broadcast signals transmitted from the plurality of transmitters 110 and 120 are distinguished from each other.

At this time, each scrambler 114 or 124 is used for distinguishing multiple terrestrial cloud broadcast signals from each other. Accordingly, each scramble sequence (first scramble sequence to Nth scramble sequence) may be selected so that the output of each scrambler 114 or 124, scrambled code word, is not included in a set of code words that may be generated by the encoder. As an example, in case a linear block code is used as an error correction code, a sequence that satisfies the condition shown in Equation 1 between scramble sequence s and parity check matrix H of the error correction code may be selected to pick up a scramble sequence that inhibits the scrambled code word from being included in a set of code words that may be generated by the encoder.

[Equation 1]

$$H \cdot s^T \neq 0 \qquad [1]$$

Here, the length of scramble sequence s is the length of the code word, n, and the size of parity check matrix H is a (n−k)×n matrix. k represents the length of data entered to the encoder.

For this, the terrestrial cloud broadcast signal transmitting apparatus 100 according to the present invention may include a generator (not shown) to generate a scramble sequence that satisfies the condition provided in Equation 1. In such case, each scrambler 114 or 124 may scramble a code word using a scramble sequence generated by the generator.

Meanwhile, each scrambler 114 or 124 may store previously generated scramble sequences in a memory for future use. In such case, the scrambler 114 or 124 may select a scramble sequence to be used among the scramble sequences stored in the memory by receiving control information from a higher layer.

The receiving apparatus that has received a code word-scrambled terrestrial cloud broadcast signal through each scrambler 114 or 124 may distinguish terrestrial cloud broadcast signals from each other based on a scramble sequence uniquely allocated for each terrestrial cloud broadcast signal.

Each scrambler 114 or 124, as an example, may scramble a code word by multiplying a scramble sequence allocated thereto (in case of the first scrambler, the first scramble sequence) by a code word generated by the encoder 112 or 114 or by performing an XOR (Exclusive or) operation between its scramble sequence and a code word generated by the encoder 112 or 114.

Figure 2:
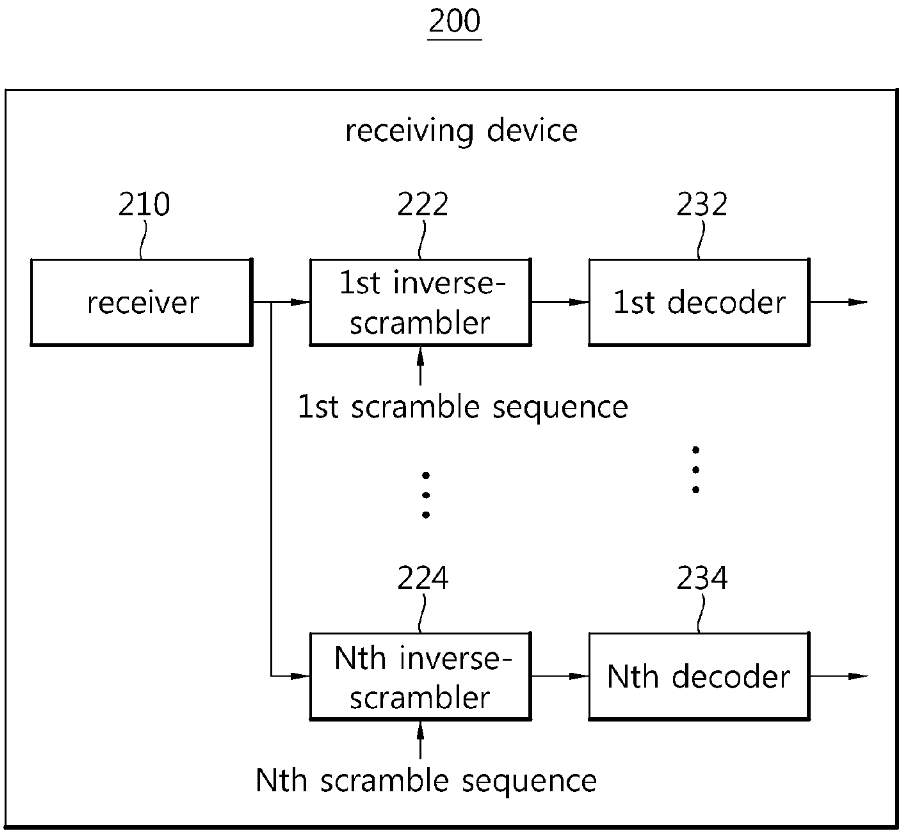
FIGS. 2 and 3 each are a block diagram illustrating a receiving apparatus for receiving a terrestrial cloud broadcast signal according to an embodiment of the present invention.
Figure 3:
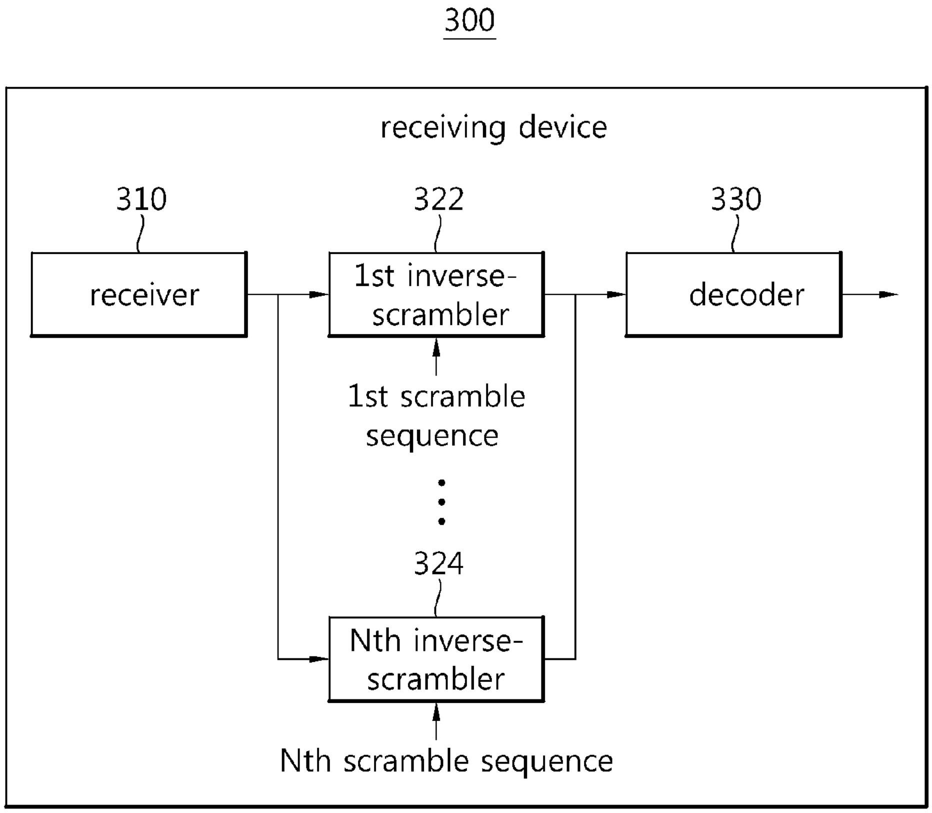

FIGS. 2 and 3 each are a block diagram illustrating a receiving apparatus for receiving a terrestrial cloud broadcast signal according to an embodiment of the present invention. Hereinafter, an example is described in connection with FIGS. 2 and 3, in which the terrestrial cloud broadcast signal receiving apparatus according to the present invention distinguishes N terrestrial cloud broadcast signals from each other and decodes the distinguished signals.

First, referring to FIG. 2, the receiving apparatus receiving a terrestrial cloud broadcast signal according to the present invention may include a receiver 210, a plurality of inverse-scramblers 222 and 224, and a plurality of decoders 232 and 234.

The receiver 210 receives at least one terrestrial cloud broadcast signal transmitted from a terrestrial cloud broadcast signal transmitting apparatus.

Each inverse-scrambler 222 or 224 distinguishes terrestrial cloud broadcast signals from each other based on a scramble sequence (first scramble sequence to Nth scramble sequence) uniquely allocated for each terrestrial cloud broadcast signal and inverse-scrambles a terrestrial cloud broadcast signal received by the receiver 210.

As an example, each inverse-scrambler 222 or 224 may inverse-scramble received terrestrial cloud broadcast signals by distinguishing terrestrial cloud broadcast signals received by the receiver 210 from each other, and in case it corresponds to itself, by multiplying the received terrestrial cloud broadcast signal by its scramble sequence. At this time, the terrestrial cloud broadcast signal may be scrambled by multiplying a code word generated by the encoder of the terrestrial cloud broadcast signal transmitting apparatus by a scramble sequence or by performing an XOR (Exclusive or) operation between the scramble sequence and the code word. Here, the scramble sequence may be selected so that the code word scrambled by the scrambler of the transmitter is not included in a set of code words that may be generated by the encoder of the transmitter.

The signal inverse-scrambled through each inverse-scrambler 222 or 224 may be decoded by each decoder 232 or 234.

Meanwhile, as shown in FIG. 3, the terrestrial cloud broadcast signal receiving apparatus 300 according to the present invention may include only one decoder 330. In FIG. 3, the operation of the receiver 310, the first inverse-scrambler 322 to the Nth inverse-scrambler 324 is the same as described in connection with FIG. 2, and the description thereof is skipped.

The decoder 330, when receiving a plurality of terrestrial cloud broadcast signals, may sequentially decode the terrestrial cloud broadcast signals inverse-scrambled by each inverse-scrambler 322 or 324.

Figure 4:
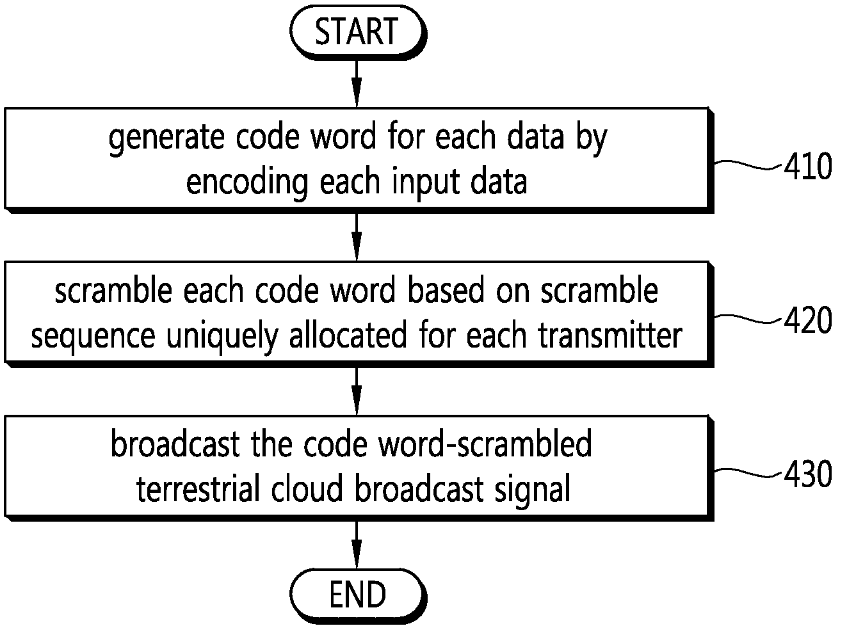
FIG. 4 is a flowchart illustrating a method of separating and distinguishing a plurality of terrestrial cloud broadcast signals from each other according to an embodiment of the present invention.

FIG. 4 is a flowchart illustrating a method of separating and distinguishing a plurality of terrestrial cloud broadcast signals from each other according to an embodiment of the present invention. Hereinafter, reference to FIG. 4 is made to describe a process of generating terrestrial cloud broadcast signals by a terrestrial cloud broadcast signal at this time according to the present invention and broadcasting the generated terrestrial cloud broadcast signals.

The terrestrial cloud broadcast signal transmitting apparatus, when receiving a plurality of data, performs error correction encoding on each of the received plurality of data using a plurality of encoders and generates a code word (410). The terrestrial cloud broadcast signal transmitting apparatus then scrambles the code word using a scrambler based on a scramble sequence uniquely allocated for each transmitter so as to distinguish the generated plurality of terrestrial cloud broadcast signals from each other (420).

At this time, each scrambler may scramble the code word by multiplying its scramble sequence by the code word or by performing an XOR (Exclusive or) operation between the scramble sequence and the code word. Here, the scramble sequence may be selected so that the scrambled code word is not included in a set of code words that may be generated by the encoder.

If the code word is scrambled through such process, the terrestrial cloud broadcast signal transmitting apparatus broadcasts the code word-scrambled terrestrial cloud broadcast signal so that a receiving apparatus, when receiving the broadcast signals, may distinguish the terrestrial cloud broadcast signals from each other based on the scramble sequence.

Figure 5:
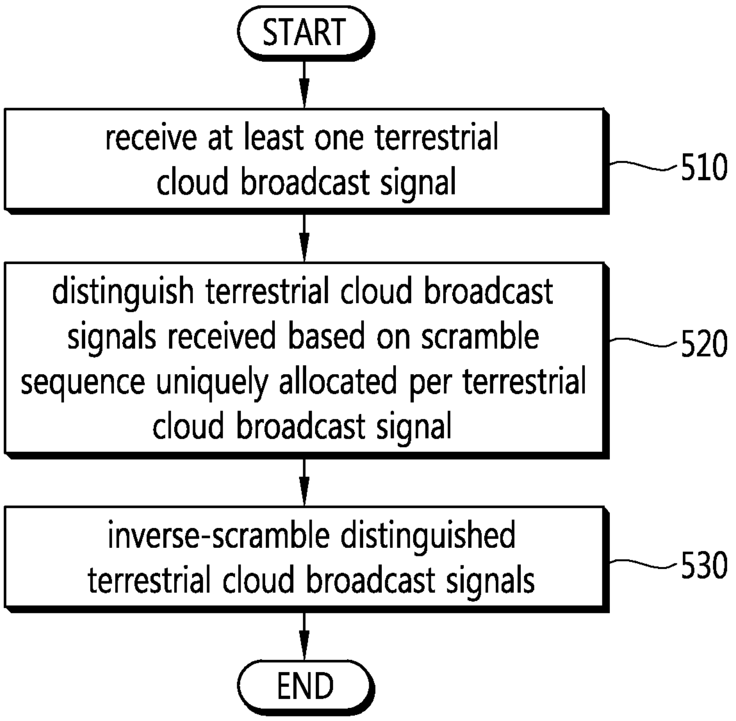
FIG. 5 is a flowchart illustrating a method of decoding a terrestrial cloud broadcast signal according to an embodiment of the present invention.

FIG. 5 is a flowchart illustrating a method of decoding a terrestrial cloud broadcast signal according to an embodiment of the present invention. Hereinafter, a process of distinguishing terrestrial cloud broadcast signals received from a terrestrial cloud broadcast signal transmitting apparatus from each other and decoding the distinguished broadcast signals by a terrestrial cloud broadcast signal receiving apparatus according to the present invention is described with reference to FIG. 5.

The terrestrial cloud broadcast signal receiving apparatus according to the present invention may receive at least one terrestrial cloud broadcast signal from the terrestrial cloud broadcast signal transmitting apparatus (510). At this time, the terrestrial cloud broadcast signal transmitted from the terrestrial cloud broadcast signal transmitting apparatus may be scrambled by multiplying a scramble sequence by a code word generated by the encoder or by performing an XOR (Exclusive or) operation between the scramble sequence and the code word. Here, the scramble sequence may be selected so that the scrambled code word is not included in a set of code words that may be generated by the encoder.

The terrestrial cloud broadcast signal receiving apparatus, as an example, when receiving a plurality of terrestrial cloud broadcast signals from the terrestrial cloud broadcast signal transmitting apparatus, distinguishes the received terrestrial cloud broadcast signals from each other based on a scramble sequence uniquely allocated for each terrestrial cloud broadcast signal (520). The terrestrial cloud broadcast signal receiving apparatus then inverse-scrambles a corresponding terrestrial cloud broadcast signal using an inverse scrambler corresponding to the distinguished terrestrial cloud broadcast signals (530).

The inverse-scrambled signals may be decoded by a plurality of decoders, respectively, or may be sequentially decoded by a single decoder. Accordingly, the terrestrial cloud broadcast signal receiving apparatus according to the present invention may demodulate each terrestrial cloud broadcast signal even when a plurality of terrestrial cloud broadcast signals are simultaneously received under the situation where the same channel interference occurs.

Although exemplary embodiments of the present invention have been described, the present invention is not limited thereto, and various modifications or variations may be made thereto without departing from the scope of the present invention. The embodiments described herein are not provided to limit the present invention but to describe the invention, and the present invention is not limited thereto. The scope of the present invention should be interpreted within the appended claims and the spirit within the equivalents of the invention should be construed to be included in the scope of the invention.

What is claimed is:

1. A terrestrial cloud broadcast signal transmitting apparatus comprising:

a plurality of transmitters for transmitting a plurality of terrestrial cloud broadcast signals, wherein each of the plurality of transmitters includes, an encoder encoding input data to generate a code word; and a scrambler scrambling the generated code word using a scramble sequence uniquely allocated for each transmitter so that the plurality of terrestrial cloud broadcast signals are distinguished from each other, wherein a plurality of scramblers are used to distinguish the plurality of terrestrial cloud broadcast signals from each other.

2. The terrestrial cloud broadcast signal transmitting apparatus of claim 1, wherein the terrestrial cloud broadcast signals are distinguished from each other based on a scramble sequence uniquely allocated to each of the terrestrial cloud broadcast signals.

3. The terrestrial cloud broadcast signal transmitting apparatus of claim 1, wherein the scrambler scrambles the generated code word by multiplying the scramble sequence by the generated code word or by performing an XOR (Exclusive or) operation between the scramble sequence and the generated code word.

4. The terrestrial cloud broadcast signal transmitting apparatus of claim 1, wherein the scramble sequence is selected so that the scrambled code word is not included in a set of code words that may be generated by the encoder.

5. The terrestrial cloud broadcast signal transmitting apparatus of claim 1, further comprising a generator generating the scramble sequence, wherein the scrambler scrambles the generated code word using the scramble sequence generated by the generator.

6. A method of separating a plurality of terrestrial cloud broadcast signals from each other by a transmitting apparatus, the method comprising:

encoding input data by using a plurality of encoders, respectively, to generate a code word; and scrambling the generated code word using a scrambler based on a scramble sequence uniquely allocated for each transmitter so that the plurality of terrestrial cloud broadcast signals are distinguished from each other, wherein a plurality of scramblers are used to distinguish the plurality of terrestrial cloud broadcast signals from each other.

7. The method of claim 6, wherein said scrambling includes multiplying the scramble sequence by the generated code word or performing an XOR (Exclusive or) operation between the scramble sequence and the generated code word.

8. The method of claim 6, wherein the scramble sequence is selected so that the scrambled code word is not included in a set of code words that may be generated by the encoder.

9. A method of decoding a terrestrial cloud broadcast signal by a receiving apparatus, the method comprising:

receiving one or more terrestrial cloud broadcast signal;

distinguishing the received terrestrial cloud broadcast signals based on a scramble sequence uniquely allocated for each terrestrial cloud broadcast signal, wherein a plurality of inverse-scramblers distinguish the one or more terrestrial cloud broadcast signals from each other;

inverse-scrambling the distinguished terrestrial cloud broadcast signals using an inverse scrambler corresponding to the distinguished terrestrial cloud broadcast signals; and decoding the inverse-scrambled signals using a decoder.

10. The method of claim 9, wherein each of the terrestrial cloud broadcast signals is scrambled by multiplying the scramble sequence by a code word generated by an encoder or by performing an XOR (Exclusive or) operation between the scramble sequence and the code word.

11. The method of claim 9, wherein the scramble sequence is selected so that the scrambled code word is not included in a set of code words that may be generated by the encoder.

* * * * *